(12) United States Patent
Brennan et al.

(10) Patent No.: US 10,062,143 B2
(45) Date of Patent: Aug. 28, 2018

(54) METHOD AND APPARATUS FOR COMPRESSING RANDOMLY ACCESSED DATA

(71) Applicant: Advanced Micro Devices, Inc., Sunnyvale, CA (US)

(72) Inventors: Chris Brennan, Boxborough, MA (US); Timour T. Paltashev, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 18 days.

(21) Appl. No.: 15/262,317

(22) Filed: Sep. 12, 2016

(65) Prior Publication Data

US 2018/0075574 A1 Mar. 15, 2018

(51) Int. Cl.
| | |
|---|---|
| *G06T 1/20* | (2006.01) |
| *H04N 19/184* | (2014.01) |
| *H04N 19/186* | (2014.01) |
| *G06T 1/60* | (2006.01) |
| *H04N 19/46* | (2014.01) |
| *H04N 19/423* | (2014.01) |

(52) U.S. Cl.
CPC ............... *G06T 1/60* (2013.01); *G06T 1/20* (2013.01); *H04N 19/184* (2014.11); *H04N 19/186* (2014.11); *H04N 19/423* (2014.11); *H04N 19/46* (2014.11)

(58) Field of Classification Search
None
See application file for complete search history.

(56) References Cited

U.S. PATENT DOCUMENTS

| | | | | |
|---|---|---|---|---|
| 5,870,097 | A * | 2/1999 | Snyder | G06T 11/001 345/422 |
| 6,795,583 | B1 * | 9/2004 | Barnes | G06T 9/00 375/240.16 |
| 8,533,166 | B1 * | 9/2013 | Sulieman | H04L 69/04 375/240 |
| 2009/0046935 | A1 * | 2/2009 | Akenine-Moller | G06T 9/00 382/235 |
| 2012/0062553 | A1 * | 3/2012 | Yang | G06T 9/00 345/419 |
| 2013/0198485 | A1 * | 8/2013 | Nystad | G06F 12/0215 711/204 |

(Continued)

OTHER PUBLICATIONS

ECMA, "Streaming Lossless Data Compression Algorithm—(SLDC)", Standard ECMA-321, Adopted by the ECMA General Assembly, Geneva, Switzerland, Jun. 2001, www.ecma.ch.

(Continued)

*Primary Examiner* — Ryan M Gray
(74) *Attorney, Agent, or Firm* — Volpe and Koenig, P.C.

(57) ABSTRACT

A method and apparatus for real time compressing randomly accessed data includes extracting a block of randomly accessed data from a memory hierarchy. One or more individual portions of the randomly accessed data are independently compressed in real time to create a lossless compressed image surface. The compressed image surface includes data of independently compressed image blocks for reading and decompressing in a random order. The method further includes storing structured information relating to the dynamically compressed randomly accessed data.

20 Claims, 7 Drawing Sheets

(56) References Cited

U.S. PATENT DOCUMENTS

| | | | |
|---|---|---|---|
| 2014/0210840 A1* | 7/2014 | Ellis | G06T 9/00 |
| | | | 345/587 |
| 2014/0354666 A1* | 12/2014 | Yang | H04N 19/50 |
| | | | 345/555 |
| 2015/0049099 A1* | 2/2015 | Ju | G09G 5/006 |
| | | | 345/520 |
| 2016/0088313 A1* | 3/2016 | Fenney | H04N 19/176 |
| | | | 382/234 |
| 2016/0283825 A1* | 9/2016 | Akenine-Moller | |
| | | | G06K 9/6218 |

OTHER PUBLICATIONS

Wikipedia "Image Compression"; http://en.wikipedia.org/wiki/Image_compression as captured Aug. 30, 2016.

De Queiroz, Ricardo, "Compression of Color Images", Xerox Corporation, Dec. 23, 2002, http://queiroz.divp.org/papers/compcolor.pdf.

Gharibi, Wajeb, "Color Image Compression Algorithm Based on the DCT Blocks", Jazan University; Aug. 2012, http://arxiv.org/ftp/arxiv/papers/1208/1208.3133.pdf.

Wang et al., "Cost Effective Block Truncation Coding for Color Image Compression", Dept. of Electronics and Computer Engineering, Hanyang University, Seoul, Korea, Sep. 2010, http://www.aicit.org/aiss/ppl/12%20-%20AISS3-106020IP.pdf.

Wikipedia "Adaptive Scalable Texture Compression", http://en.wikipedia.org/wiki/Adaptive_Scalable_Texture_Compression as captured Jul. 30, 2016.

* cited by examiner

400

| 8-BIT KEY CODE | | | | | | | |
|---|---|---|---|---|---|---|---|
| X | X | 1 | X | 1 | 1 | X | 1 |
| X | 1 | X | 0 | X | X | 1 | 0 |
| X | X | X | 0 | X | 0 | X | 0 |
| X | 1 | 1 | 1 | 0 | 1 | X | 0 |
| X | 1 | X | X | X | X | X | 0 |
| X | X | 1 | 0 | X | 0 | 1 | 1 |
| X | 1 | X | X | X | 1 | X | 1 |
| X | X | 1 | 0 | X | 1 | 0 | 0 |
| X | 1 | 0 | 0 | X | 0 | X | 1 |

| 7 | 6 | 5 | 4 | 3 | 2 | 1 | 0 |
|---|---|---|---|---|---|---|---|
| SECTOR 3 | | SECTOR 2 | | SECTOR 1 | | SECTOR 0 | |
| 64B | | 64B | | 64B | | 64B | |
| 128B | | | | 128B | | | |
| 256B | | | | | | | |
| 128B | | | | 64B | | 128B | | 
| 64B | | 64B | | 128B | | 64B | |
| 64B | | 128B | | 64B | | 64B | |
| 64B | | 192B | | | | 64B | |
| 192B | | | | 64B | | | |

FIG. 4

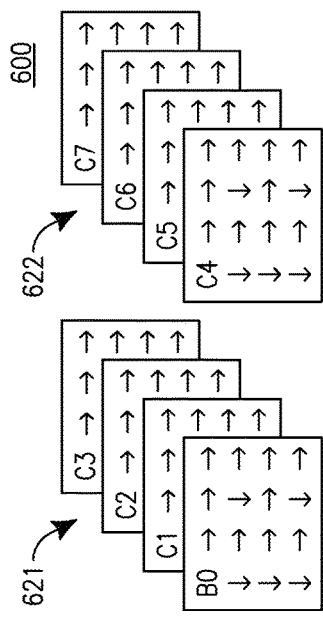
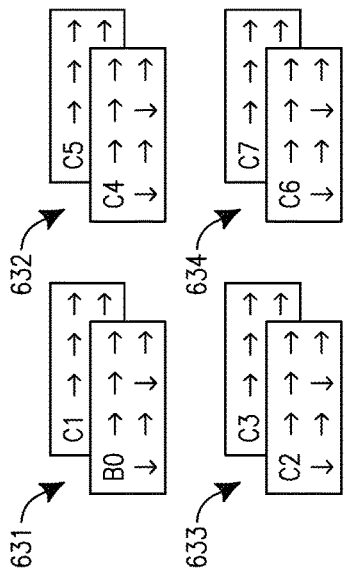
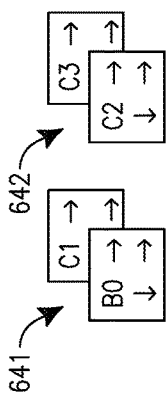
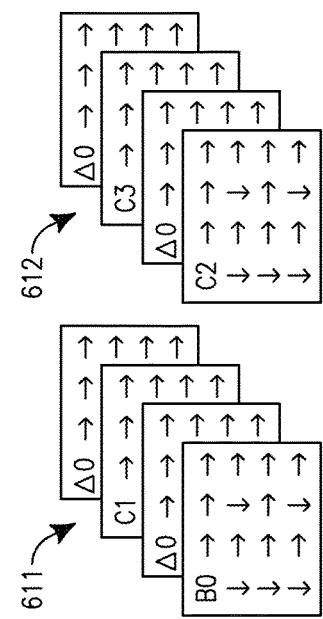
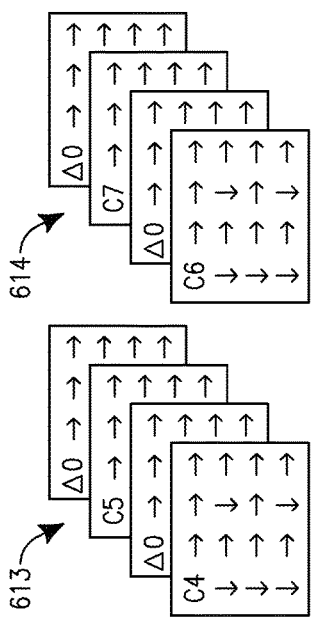
FIG. 6A
FIG. 6B
FIG. 6C
FIG. 6D

US 10,062,143 B2

METHOD AND APPARATUS FOR COMPRESSING RANDOMLY ACCESSED DATA

BACKGROUND

Graphics Processing Unit (GPU) architectures are suitable for delivering high throughput. However, GPU memory interfaces could be limited on a finite amount of bandwidth. Another issue is significant power dissipation while data is being transferred to and back from the memory. By utilizing data compression, performance can be increased in addition to potential power savings.

Conventional data compression schemes compress an entire graphics image surface at once. Then, during a readback, conventional data compression schemes read the entire image surface, and decompress the entire image surface after reading. This process can incur a granularity loss due to significant redundancy in the data transfer and processing. When processing real-time graphics, the access patterns can require the access to certain fragments or blocks of surface and are not as predictable as the access patterns that allow for the encoding and decoding of an entire image or video. Due to the nature in which real-time graphics pipeline is rendering, random access is needed in order to fetch, decompress, and write back only certain blocks of entire surface to reduce required memory bandwidth and power dissipation.

Both lossy and lossless compression schemes can be applied for image surfaces but in the case of sequential multistage image data processing lossless techniques can be desirable to save image fidelity.

BRIEF DESCRIPTION OF THE DRAWINGS

A more detailed understanding can be had from the following description, given by way of example in conjunction with the accompanying drawings wherein:

FIG. 4 is an example compression key table;

FIGS. 6A-6D show an example thick neighbor calculation; and

DETAILED DESCRIPTION OF THE EMBODIMENTS

Figure 1:
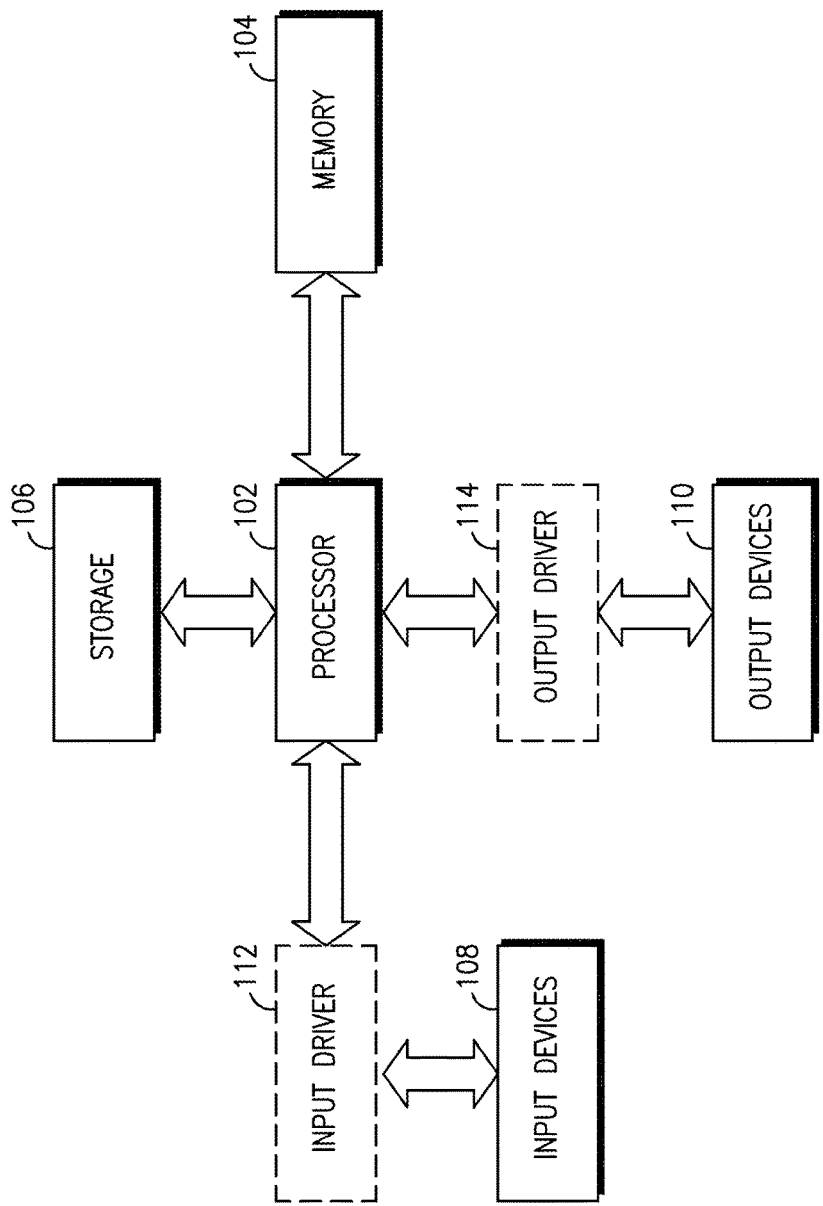
FIG. 1 is a block diagram of an example device in which one or more disclosed implementations can be implemented.

Based on the limitations of the conventional data compression schemes, it would be beneficial to provide a method and apparatus for lossless real time, (i.e., on-the-fly), compressing and decompressing of randomly accessed data. Although a more detailed description of the embodiments is provided below, briefly a method and apparatus for lossless compressing randomly accessed data is described. A metadata surface with compression keys that describe the layout of the block that is compressed is created when the data is compressed. Blocks are compressed in a real-time streaming manner and are dynamically decompressed based upon the access requirements.

A method of lossless compressing and decompressing of randomly accessed data is disclosed. The method includes extracting a block of randomly accessed data from a memory hierarchy. One or more individual portions of the randomly accessed data are independently compressed in real time to create a lossless compressed image surface. The compressed image surface includes data of independently compressed image blocks for reading and decompressing in a random order. Structured information is stored that relates to the dynamically compressed randomly accessed data.

An apparatus for compressing randomly accessed data is disclosed. The apparatus includes a processor and a memory including a cache. The processor is configured to extract a block of randomly accessed data from a memory hierarchy, independently compress in real time one or more individual portions of the randomly accessed data to create a lossless compressed image surface, wherein the compressed image surface includes data of independently compressed image blocks for reading and decompressing in a random order, and store structured information relating to the dynamically compressed randomly accessed data.

Table 1 below includes definitions that apply throughout the following detailed description.

TABLE 1

| Term | Expanded | Description |
| --- | --- | --- |
| DCC | Delta Color Compression | A color compression scheme for Color Buffer that is based upon deltas between neighboring pixels. |
| Block | | A portion of data that can be compressed or uncompressed |
| Uncompressed Block | | A block that can be in a cache, or the size of the data uncompressed. Currently at most 256 B to fit in a cache line, for example |
| Compressed Block | | A block stored in memory that can be smaller than the logical data. At a minimum of 32 B and maximum of the Uncompressed Block size, for example |
| Sector | | Unit of data that can be allocated in the cache. 64 B with byte masks for valid bytes, for example |
| CL | Cache Line | Data backed by one tag. 64 B *4 sectors = 256 B, for example |
| Key | Compression Key | Meta data that describes the layout of compressed block (how and where to find the compressed blocks for any access). Can span multiple compressed blocks to allow localizing requests for better memory efficiency |
| Metadata | | Data that describes other data. For DCC, this is data that describes the compressed region, encoding how and whether or not the block is compressed among other things, for example |

FIG. 1 is a block diagram of an example device 100 in which one or more disclosed embodiments are implemented. The device 100 can be implemented as a computer, for example, a desktop computer, a tablet computer, a gaming device, a handheld device, a set-top box, a television, or a mobile phone. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

The processor 102 can be implemented as a central processing unit (CPU), a graphics processing unit (GPU), a CPU and GPU located on the same die, or one or more processor cores, wherein each processor core is a CPU or a GPU. The memory 104 can be located on the same die as the processor 102, or can be located separately from the processor 102. The memory 104 can include volatile or non-volatile memory, for example, random access memory (RAM), dynamic RAM, or a cache.

The storage 106 can include a fixed or removable storage, for example, a hard disk drive, a solid state drive, an optical disk, or a flash drive. The input devices 108 can include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 can include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. Although described embodiments include a main display, the invention can be practiced without a main display, and only include a source device of video. In this way, the control territory can be an office environment with a plurality of portable devices and no main display.

Figure 2:
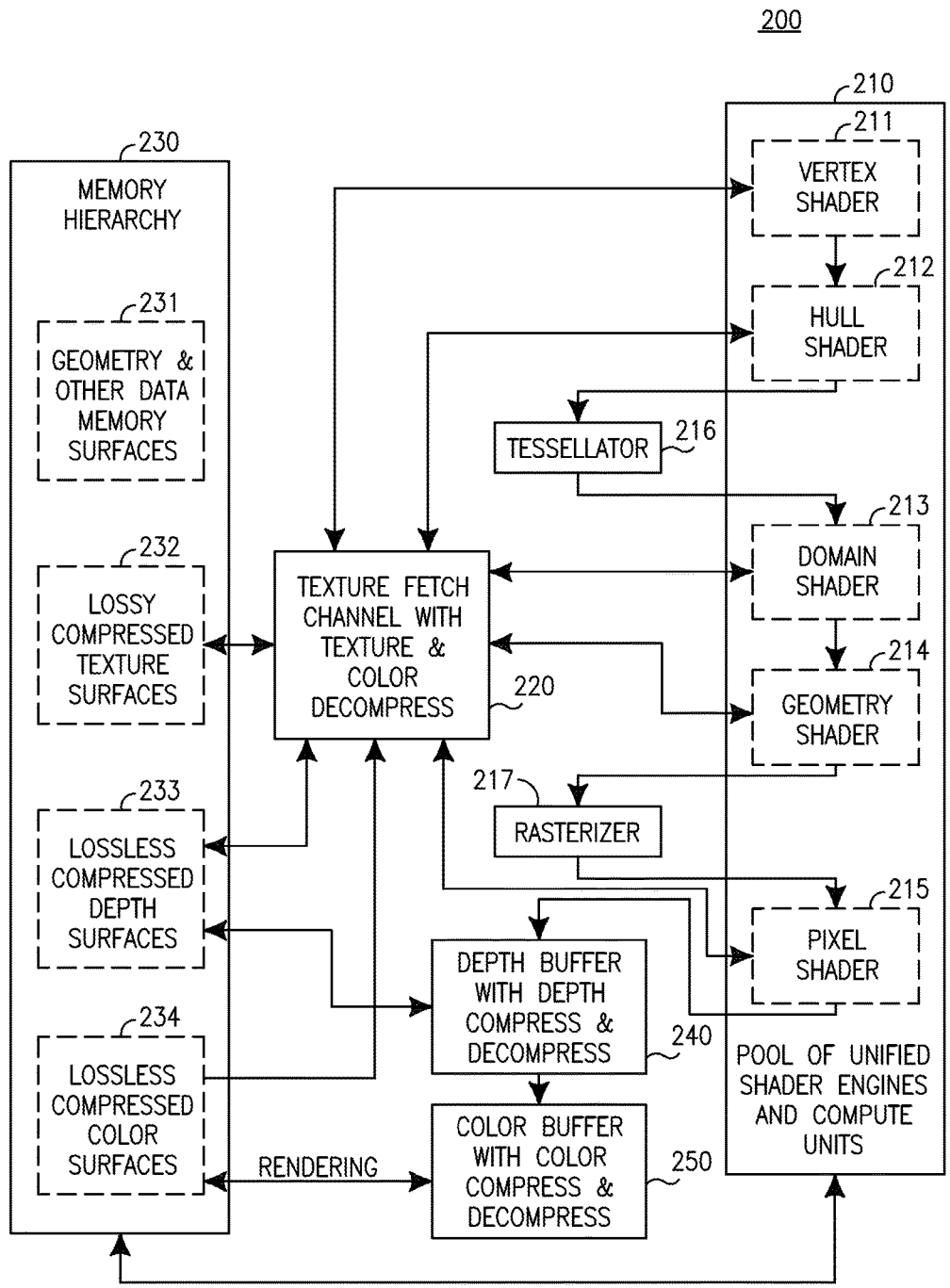
FIG. 2 is a block diagram of an example graphics pipeline.

FIG. 2 is a block diagram of an example graphics pipeline 200. The pipeline 200 includes a pool of unified shader engines with compute units (pool) 210, a tessellator 216, a rasterizer 217, a texture fetch channel with texture and color decompress circuit element 220, a memory hierarchy 230, a depth buffer with depth compress and decompress circuit element 240, and a color buffer with color compress and decompress circuit element 250. In variations, the pool 210 is implemented using fixed function shader or compute units, as opposed to unified programmable shader engines. The method described herein is performed in the color buffer with color compress and decompress circuit element 250. In various implementations, the pool 210 executes one or more of a vertex shader 211, a hull shader 212, a domain shader 213, a geometry shader 214 and a pixel shader 215 program codes (kernels). The color decompressor included in element 220 is placed between L2 and L1 caches, for example. Additionally, the color decompressor in element 220 is a component of a compressed data fetching component in element 220 along with lossy texture surface decompressors that are included in element 220. The circuit elements described in the pipeline 200 are found in a processor, such as processor 102 described above. For example, the circuit elements are included in a GPU.

The memory hierarchy 230 includes data stored in it such as geometry data surfaces 231, lossy compressed texture surfaces 232, lossless compressed depth surfaces 233, and lossless compressed color surfaces 234.

Figure 3:
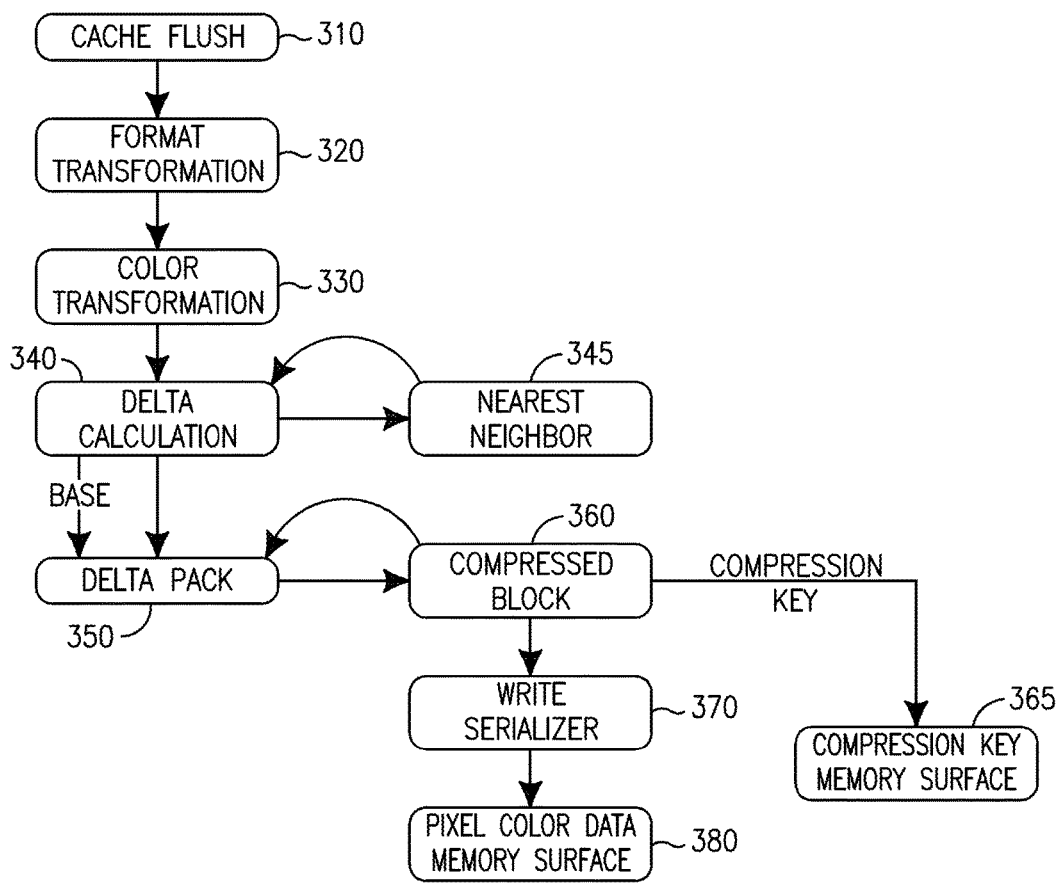
FIG. 3 is a flow diagram of an example method for compressing randomly accessed data.

FIG. 3 is a flow diagram of an example method 300 for compressing randomly accessed data. For example, frame buffer data, (e.g., display data), or any displayable image surface that is used to blend with a rendered image in a graphics pipeline that is stored in the memory hierarchy 230 is be accessed and compressed. Accordingly, in step 310, data is flushed, or accessed, (e.g., written out), from the memory hierarchy 230 for processing. The data that is accessed can be data from any level of memory, (e.g., a graphics or general purpose L2 cache), depending on the data desired to compress and/or decompress. The method 300, described in additional detail below, provides for the compression of one or more portions of randomly accessed data to create a lossless compressed image surface that includes information relating to the compression.

The information relating to the compression is in the form of a compression key. The compression key accumulates necessary information about the delta packing to provide proper layouts during unpacking. The compression or DCC key is an 8 bit field which is a list of uncompressed block sizes and how many transaction IDs (TIDs) were used to encode them. The 8 bit DCC keys correspond to 256 bytes of the render target's color surface. FIG. 4 is such an example of a compression table 400A and corresponding key code table 400B, where each column corresponds to the 8 bits, (i.e., 7-0), of Table 400A. Table 400A shows the layout of an 8-bit DCC Key for different uncompressed block sizes.

As can be seen in key table 400A, each pair of bits, (i.e., 0/1, 2/3, 4/5, and 6/7), is assigned to a corresponding 64 byte block, (e.g., bytes 0-64 for bits 0 and 1, bytes 65-127 for bits 2 and 3, 128-191 for bits 4 and 5, and 192-255 for bits 6 and 7). Therefore, each key is mapped to a sequence of 64 byte aligned blocks of uncompressed data where each 64 bytes corresponds to 2 bits of the key. Each block spans one, many or all four of the 64 byte blocks as depicted in compression key table 400A.

The amount of data grouped into each uncompressed block is unary encoded starting on the least significant bit of the key followed by an encoding of the number of 32 byte transfers required to encode the compressed block. Therefore, the least significant bit of each block in the key in table 400B, if set, indicates whether the next block's uncompressed size is 64 bytes, and if so, the next bit indicates if the compression is 32 bytes, (0=2:1 compressed), or 64 bytes, (1=uncompressed). If the first bit of a new block is 0, the second least significant bit, if set, indicates that the block's uncompressed size is 2 sectors (128 bytes), and the following 2 bits indicates how many 32 bytes of compressed data is stored for this block. This unary encoding continues for 192 byte and 256 byte uncompressed block sizes. Accordingly, the corresponding key code table 400B identifies what compression is in use between 64 bytes up to 256 bytes.

For example, "X1" indicates a 64 byte uncompressed byte size where the value of "X" indicates if the compression is 32 bytes, (e.g., where X=0), or 64 bytes. Additional compressed block sizes may be calculated by adding 1 to the bits following the uncompressed encoding, (e.g., XX, XXX, etc.), and multiplying the result by 32 bytes. For example, "XX10" indicates 128 byte uncompressed size, "XXX100" indicates 192 uncompressed block size, and "XXX01000" indicates 256 byte uncompressed block size.

For example, the data is color video or color graphics rendered data received from the vertex shader 211, hull shader 212, domain shader 213, geometry shader 214 or pixel shader 215. In step 320, a format transformation or swizzle is performed where the rendered surface blocks of incoming formats which are not byte aligned into byte borders are converted to a byte stream, (i.e., stream of bytes), by grouping up bits of different color channels together to make complete byte-based sequence for further color space transformation with channel separation. For example, channel separation includes performing a color space conversion where the correlation that exists between the color channels containing red (R) and green (G) components is more effectively compressed by having smaller values.

For example, for each 4 byte group, R'=R-G. G'=G. For the blue (B) component, B'=B-G. This approximates the YUV color space by assuming G most resembles luminosity and the other two channels vary in intensity with it. The bytes for one channel are grouped together so that each chunk of data has neighboring pixels, (e.g., channel swizzle: ByteIndex=[ByteInChannel] [Channel] [Position(X,Y)]).

The RGBA channels, (where A is the "alpha" channel), are separated per each pixel to acquire all bytes to be grouped for multiple pixels. That is, pixels R1, G1 and B1, R2, G2, and B2, R3, G3 and B3, and R4, G4 and B4 are separated and grouped, for example as follows: R1R2R3R4, G1G2G3G4, B1B2B3B4. Depending on the initial format, (e.g., byte-aligned or non byte-aligned), the format transformation is performed differently. Since the incoming formats are not necessarily byte aligned, they are converted into a byte stream by grouping up bits of different channels together to make bytes which are correlated.

For formats having non byte aligned channels, either the most significant bits (MSBs) or least significant bits (LSBs) of each of those channels are grouped together to form a byte that doesn't change often, (e.g., MSBs), or a noisy byte is formed that leaves the other channels more compressible, (e.g., LSBs). For formats that have multiple bytes per channel, the upper byte per channel is grouped into one block, then the next lower bytes are grouped together until the lowest bytes of each channel are grouped together.

For example, in a 10 or 11 bit format, bits of the data are gathered so that bits from a same source position are gathered adjacent to one another For example, a filter is applied that converts the incoming formats that are not byte aligned into a byte stream by grouping bits of different color channels together to create bytes that are correlated. For formats that have non-byte aligned channels, either the MSBs or LSBs of each of those channels are grouped together to make a byte that doesn't change often (MSBs) or else makes a noisy byte that leaves the other channels more compressible (LSBs). For formats that have multiple bytes per channel, the upper bytes per channel are grouped into one block, and the next lower bytes together until the lowest bytes of each channel are grouped together. For a 5 or 6 bit format, (e.g., non-byte aligned), a byte, (e.g., high byte), is assigned an alpha bit at the MSB followed by the most significant green bits and the least significant red and blue bits in the original order. Accordingly, this high byte is made more compressible, while a subsequent byte, (e.g., the second byte), has the rest of the red and blue bits interleaved.

In step 330 a color transformation is performed. This transformation is to convert the representation of color in one color space to another. For example, a color space conversion is performed to decorrelate the color channels. That is, the color data is grouped into blocks of highly correlated data and non-correlated data blocks to decorrelate the color channels. Channel swizzle, (described above), is applied to group neighboring pixels of the color channel data.

Accordingly, the color transformation includes performing a correlation between the channels allowing red (R) and green (G) to be more effectively compressed by having smaller values. For example, where the color channels, (e.g., R and G), include similar attributes such as similar levels of brightness, those blocks are grouped as correlated data blocks. The channels can also be separated in preparation for the color space conversion to sort bytes in the order of greatest correlation.

A delta calculation is then performed on the streaming real-time data, to replace full size values of data items with smaller deltas versus selected base values. That is, the gradient or difference, (i.e., delta), between neighboring pixels in the image is calculated. The delta values can be encoded on less number of bits than full scale value by, for example, storing the values of the differences, or widths, between the neighboring pixels. Multistage compression is utilized, for example, within the format conversion to further reduce possible delta values and their lengths for further backend compression. To reduce the gradient or delta values, maximal similarity in the data blocks is searched, (e.g., using different parsing schemes depicted and described in FIG. 5 and FIG. 6 following).

To determine similarity in a numerical space conversion to different formats as described are utilized. As mentioned above, smaller numerical gradients or delta values require less bits for encoding for compression (step 340). Smaller blocks indicate less numerical similarity is found which reduces the respective compression ratio. For example, 256 bytes is one cache line size which for processing. However, if block sizes are larger, the compression ratio is improved finding more similarities with maximally reduced value/size of gradients/deltas. For example, the delta calculation can be performed on a 32 byte or 64 byte block of an example entire 256 byte block. In the delta calculation, the nearest neighbor technique (step 345) is utilized, which will be described in further detail below. The delta calculations are utilized as bases to determine whether or not compressed blocks should be joined into a larger compressed block. For example, if the delta between compressed blocks is less than a predefined threshold, the blocks are combined. The delta from a closest previous byte that neighbors the byte being examined is utilized. If no previous neighbor byte exists, original data is utilized for the delta calculation.

For example, the gradient between each neighbor along a two-dimensional (2D) tree is calculated. The 2D tree proceeds outward from a base byte, (e.g., in a growing squares order), such that each power of two bytes is local to itself in a rectangle and connected to the neighboring rectangle only by one delta. This pattern minimizes the distance between any two pixels measured in the number of deltas required to calculate the furthest pixel from the base.

The pattern has a balanced number of horizontal and vertical deltas such that the horizontal deltas can be compressed together and the vertical deltas can be compressed together to leverage the likelihood of similar sizes. After color space conversion and delta calculation are performed, both of which are performed using 256 wrapping math, the result is signed and is transformed into an unsigned form. That is, signed bytes are converted to a more compressible format that often has MSBs equal to zero.

Figure 5A:
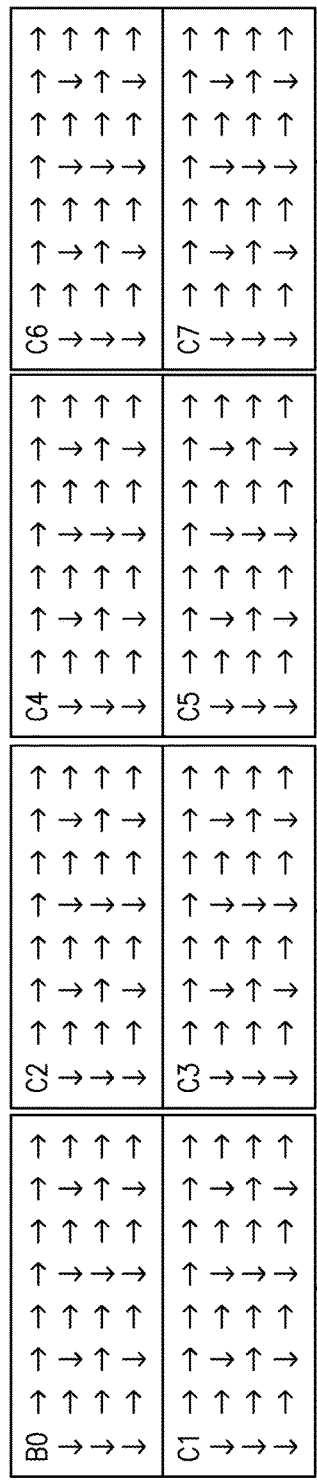
FIGS. 5A-5D show an example thin neighbor calculation.
Figure 5C:
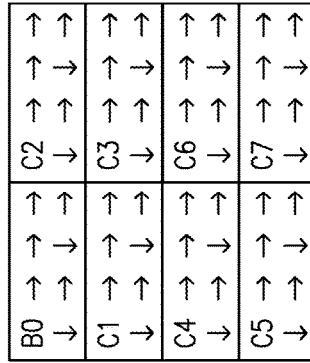
Figure 5B:
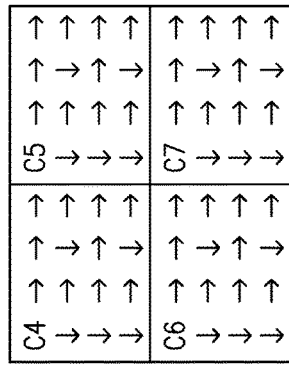
Figure 5D:
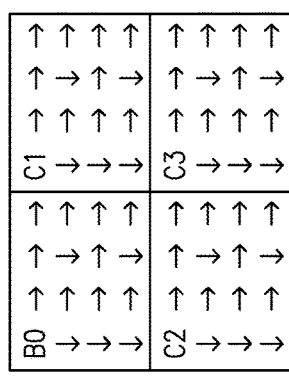

FIGS. 5A-5D show an example thin neighbor calculation for compressing randomly accessed data. FIG. 5A depicts 1 BPP layer neighbor calculations 511, 512, 513 and 514. FIG. 5B depicts 2 BPP layer neighbor calculations 521 and 522. FIG. 5C depicts 4 BPP layer neighbor calculations 531. FIG. 5D depicts 8 BPP layer neighbor calculations 441. In each of FIGS. 5A-5D, bit B0 is utilized as a base bit. As depicted in FIGS. 5A-5D, the neighbor deltas are saved in their nearest neighbor, (e.g., the arrows depicting a delta calculation bit in one block are saved to base bits C1-C7 in the next block). In addition, the arrows in the top corners of every other block are saved in alternating blocks, (e.g., the top right corner bit of the block containing bit B0 is saved in the top right corner bit of the block containing base bit C2, and so forth).

Because the delta calculation directions are hard coded to be agnostic to the number of channels and number of bytes per channel in order to take advantage of the growing squares pattern of the non-displayable element order, the byte order is converted to match what the delta calculator expects. This aids in making the memory surfaces displayable, which are then readable by a display controller and shown on a display screen (not shown).

The immediate neighboring pixels are used to minimize the size of the resulting delta, and the arrow directions are balanced horizontally and vertically when possible to remove directional bias that may otherwise allow horizontal silhouettes to encode smaller than vertical ones, so that either direction is equally compressible, for example. The directions are constrained, however, within their 64 byte group to preserve the ability to process each 64 bytes of data individually as it moves through the memory hierarchy without the need to accumulate data.

An up to 4:1 multiplexing (mux) based on the number of bytes per pixel (BPP) up to 8 bytes/pixel is utilized, for example, to mux the element index from a displayable location to a nondisplayable location as depicted in Table 2 below, which shows an example thin neighbor calculation.

TABLE 2

| Non-Displayable | element_index[4:0] = {x[2], y[1], x[1], y[0], x[0]} |
|---|---|
| 1 BPP | element_index[4:0] = {y[0], y[1], x[2], x[1], x[0]} |
| 2 BPP | element_index[3:0] = {y[0], x[2], x[1], x[0]} |
| 4 BPP | element_index[2:0] = {y[0], x[1], x[0]} |
| 8 BPP | element_index[1:0] = {y[0], x[0]} |

FIGS. 6A-6D show an example thick neighbor calculation for compressing randomly accessed data. FIG. 6A depicts 1 BPP layer neighbor calculations 611, 612, 613 and 614. FIG. 6B depicts 2 BPP layer neighbor calculations 621 and 622. FIG. 6C depicts 4 BPP layer neighbor calculations 631, 632, 633 and 634. FIG. 6D depicts 8 BPP layer neighbor calculations 641 and 642. As depicted in FIGS. 6A-6D, the neighbor deltas are saved in their nearest neighbor in a similar manner as those depicted in FIGS. 5A-5D. In the example shown in FIGS. 6A-6D, the source byte for the delta is statically calculated by computing the X, Y, and Z byte from the byte index, subtracting one off of each X, Y and Z, then converting back to a byte index and selecting the nearest byte. Table 3 below shows an example conversion between coordinates to a byte index for a thick neighbor calculation depending on the BPP.

TABLE 3

| 1 BPP | byte_index[7:0] = {y[2], x[2], z[1], z[0], y[1], x[1], y[0], x[0]} |
|---|---|
| 2 BPP | byte_index[7:0] = {x[2], z[1], z[0], b[0], y[1], x[1], y[0], x[0]} |
| 4 BPP | byte_index[7:0] = {z[1], y[1], z[0], b[1], b[0], x[1], y[0], x[0]} |
| 8 BPP | byte_index[7:0] = {y[1], x[1], z[0], b[2], b[1], b[0], y[0], x[0]} |
| 16 BPP | byte_index[7:0] = {x[1], z[0], y[0], b[3], b[2], b[1], b[0], x[0]} |

After the delta calculation is performed, the data is compressed via a delta pack (step 350), which includes byte packing where for each bin of bytes, the maximum delta width is calculated and only the significant bits of the deltas, as well as a code which indicates how wide they are, get stored, (e.g., the compression key).

A delta compression determines what level of packing can be utilized for the data block, (e.g., 32 byte, 64 byte, etc.), and then packs/compresses the blocks into as small a block as possible, (e.g., via entropy encoding). For example, if only a small amount of data is being accessed in step 310, that entire block is compressed. However, if there is a block of uncompressible data next to a block of compressed data, the uncompressible block is separated and stored prior to attempting to determine a new compression scheme for the rendered image block of data accessed.

Accordingly, a block-based compressed image surface can be non-uniform on data interpretation depending on the applied compression scheme or not compressed at all due to inefficiency. To process such compressed image surface descriptors or keys referring to the used compression scheme are utilized. These descriptors are assigned per data block of a convenient size and named as metadata if they are organized as a separate data structure or surface with a different base address. For example, a color base could be organized as a color surface data structure, while a DCC base could be organized as a DCC key surface data structure. This surface is completely synched with the original surface in a ratio, (e.g., 1 byte of metadata per 256 bytes of actual data surface in case of color compression key).

The dynamic compression in step 350 is performed based upon what memory client destination performing a read of the data, (e.g., dedicated hardware unit, GPU engines, display, shader core). For example, the maximum delta width necessary is determined and the significant bits of the deltas are stored. In the compressed block step 360, a metadata (compression key) information surface relating to the size of the packed blocks is generated, storing information as to the size and storage area of the compressed block for utilization in decompression and stored in compression key memory surface 265.

The metadata surface 365, (e.g., compression key), is read during a random access to memory hierarchy cache access, (e.g., step 310), so that the method 300 contains the size of a compressed delta block to only perform an access read on as large enough a block size as necessary. A DCC metadata element can be an 8-bit per compressed 256 B color surface block, and contain the compression key, such as in FIG. 4, or a DCC fast clear key. It is the metadata for a color surface. The Color surface element size can vary from 8 BPP to 128 BPP with a varying number of components from 1 to 4, and contains the color components.

The compressed block is then transferred in the write serializer (step 370), while other data blocks are read from the pool 210, and processed pipelined manner on steps 320, 330, 340, 345, 350 and 360. Compressed block serialized data is stored in the pixel color data memory surface (step 370) and along with appropriate compression key metadata surface 265. Accordingly, the above method is a pipelined processing of a byte stream with color data accessed from the cache to be compressed and delivered to the main memory in the case of a frame buffer memory write. When data is read from the frame buffer memory, the flow operates in the opposite direction.

Figure 7:
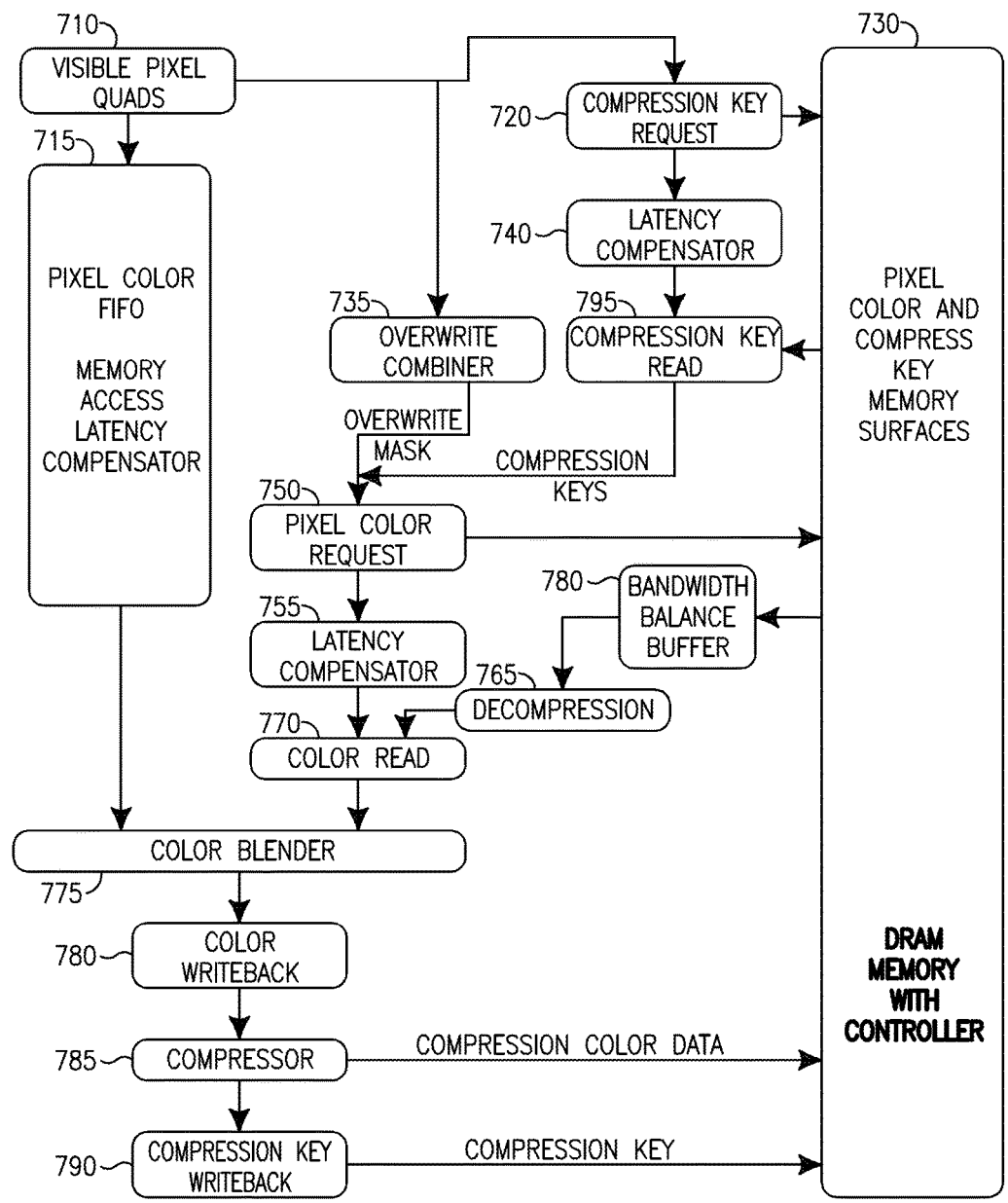
FIG. 7 is an example implementation of the example method of FIG. 3.

FIG. 7 is an example implementation 700 of the example method 300 of FIG. 3 and demonstrates decompression path in more details as well as compression path connected to color data processing or blending in graphics pipeline. Implementation 700 includes a visible pixel quads source block 710, memory access latency compensator 715, compression key request block 720, dynamic random access memory (DRAM) with controller 730, an overwrite combiner block 735, latency compensator 740, compression key read block 745, pixel color request block 750, latency compensator 755, bandwidth balance buffer 760, decompression block 765, color read block 770, color blender block 775, color writeback 780, compressor 785 and compression key writeback block 790.

Data, (e.g., color graphics data), might be generated by the shader in the graphics pipeline and read in from the visible pixel quads source block 710 into memory access latency compensator 715 (FIFO buffer for pixel quad colors), compression key request block 720 (pixel quad coordinates) and overwrite combiner 735 (pixel quad mask). The compression key request block 720 requests the stored compression key from respective metadata surface located in DRAM with controller 730 that was stored in step 360.

When a non-uniform compressed surface is processed, (i.e., read with decompression-modify-write-back with compression), it can be beneficial to be aware of the data footprint change inside the block after a possible compression scheme change following the pixel quad blending (modification) process. Accordingly, all potentially affected color data blocks are fetched from memory and decompressed. The overwrite mask contains such information.

The overwrite combiner 735 utilizes the fact that data will get combined to determine whether or not a future block must be read and decompressed before being modified by compressing it as a new block in method 300. For example, if a write is smaller than the size of an underlying decompressed block, the block for writing must be read and decompressed prior to modification. The overwrite combiner 735 tracks incoming pixel quads to determine which parts of data block, or sectors of a cacheline, are to be fully overwritten after blending/modification and following compression.

The data block contains color data in variable number of quads depending on the compression ratio and pixel format. The actual number of affected blocks and their address/layout for pixel color request is defined after combination of the overwrite mask and compression key information.

The compression key read block 745 reads the compression key(s) stored in DRAM with controller 730 to define pixel color request scope in pixel color request block 750 and saved in latency compensator 755 to be used later in decompressing the color data from DRAM with controller 730 in the decompression block 765. The pixel color request block 750 receives overwrite mask from overwrite combiner block 735 and compression keys from compression key read block 745 which are used to generate pixel color request for retrieval relevant data blocks from color memory surface in DRAM with controller 730. Overwrite masks and compression keys are saved in memory access latency compensator 755 and sent to the color read block 770. The decompression block 765 is paired with bandwidth balance buffer 760 and provides decompression of color data using compression keys received from latency compensator 755. The color read block 770 combines both color and overwrite mask data for further processing in color blender block 775 which uses pixel color quad data from latency compensator 715 for blending. Final pixel quad color data block is formed in the color writeback block from blended and unchanged pixels protected by overwrite mask.

The compressor 785 performs streaming compression, for example according to the example method 300, image data and writes the compressed color data to the color surface in DRAM memory 730. The compression key writeback block 790 writes the compression key to a separate compression key surface in DRAM memory 730 for later use in decompression in case of repetitive access.

The methods provided can be implemented in a general purpose computer, a processor, or a processor core. Suitable processors include, by way of example, a general purpose processor, a special purpose processor, a conventional processor, a digital signal processor (DSP), GPU shader processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the present invention.

The methods or flow charts provided herein can be implemented in a computer program, software, or firmware incorporated in a computer-readable storage medium for execution by a general purpose computer or a processor, or specialized hardware in ASIC or FPGA. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Additionally, although element 220 of FIG. 2 is depicted as a "texture fetch" element, the element could be directed to any level of the memory cache hierarchy, (e.g., Graphics L2). Still additional implementations can include a decompressor on the way to a display pipeline, which can be connected as a separate path from the texture fetch, can read through the L2 cache.

What is claimed is:

1. A method of real time visual data compression, comprising:
   extracting a block of randomly accessed data from a memory hierarchy;
   separating the block of randomly accessed data into a plurality of color channels;
   performing a color space conversion that decorrelates each of the plurality of the color channels to generate color transformed data;
   determining a block size for the transformed data based on a similarity in a numerical space of the color transformed data;
   independently compressing, using the block size, one or more individual portions of the randomly accessed data to create a lossless compressed image surface, wherein the compressed image surface includes data of independently compressed image blocks for reading and decompressing in a random order; and
   storing structured information relating to the lossless compressed image surface.

2. The method of claim 1, further comprising generating a compression key that includes information regarding the compression of the compressed image surface.

3. The method of claim 2, further comprising decompressing the individual portions of the randomly accessed data that are compressed.

4. The method of claim 3 wherein the individual portions of the randomly accessed data are decompressed using the compression key retrieved from a memory.

5. The method of claim 1 wherein the structured information includes at least one of a compressed color surface or a compression key surface.

6. The method of claim 1, further comprising sorting the color transformed data in order of bytes of greatest correlation to form a correlated group of bytes prior to compressing.

7. The method of claim 6, further comprising separating the correlated group of bytes of the randomly accessed data from bytes of non-correlated data.

8. The method of claim 7, further comprising calculating a gradient between each neighboring pixel of the correlated group of bytes and storing the gradient as a delta between a first and second compressed image block.

9. The method of claim 8 wherein the structured information further includes the gradient.

10. The method of claim 9, further comprising combining the first compressed image block with the second compressed image block on a condition that the gradient between the first and second compressed image blocks is less than a predefined threshold.

11. An apparatus, comprising:
a memory including a cache; and
a processor communicatively coupled to the memory, wherein the processor:
extracts a block of randomly accessed data from a memory hierarchy,
separates the block of randomly accessed data into a plurality of color channels,
performs a color space conversion that decorrelates each of the plurality of the color channels to generate color transformed data;
determines a block size for the transformed data based on a similarity in a numerical space of the color transformed data,
independently compresses, using the block size, one or more individual portions of the randomly accessed data to create a lossless compressed image surface, wherein the compressed image surface includes data of independently compressed image blocks for reading and decompressing in a random order, and
stores structured information relating to the lossless compressed image surface.

12. The apparatus of claim 11 wherein the processor further generates a compression key that includes information regarding the compression of the compressed surface.

13. The apparatus of claim 12 wherein the processor further decompresses the individual portions of the randomly accessed data that are compressed.

14. The apparatus of claim 13 wherein the individual portions of the randomly accessed data are decompressed using the compression key retrieved from a memory.

15. The apparatus of claim 11 wherein the structured information includes at least one of a compressed color surface or a compression key surface.

16. The apparatus of claim 11 wherein the processor further forms a correlated group of bytes prior to compressing by sorting the color transformed data in order of bytes of greatest correlation.

17. The apparatus of claim 16 wherein the processor further separates the correlated group of bytes of the randomly accessed data from bytes of non-correlated data.

18. The apparatus of claim 17 wherein the processor further configured to calculate a gradient between each neighboring pixel of the correlated group of bytes and store the gradient as a delta between a first and second compressed image block in an area of the memory.

19. The apparatus of claim 18 wherein the structured information includes the gradient.

20. The apparatus of claim 19 wherein the processor is further configured to combine the first compressed image block with the second compressed image block on a condition that the gradient value between the first and second compressed image blocks is less than a predefined threshold.

* * * * *